(12) United States Patent
Islam et al.

(10) Patent No.: US 8,726,742 B2
(45) Date of Patent: May 20, 2014

(54) TORQUE SENSING SYSTEM HAVING TORQUE SENSOR, AND STEERING SYSTEM

(75) Inventors: Mohammad S. Islam, Saginaw, MI (US); Mohammed Rakibul Islam, Saginaw, MI (US); Matthew Mielke, Freeland, MI (US); Christian E. Ross, Hemlock, MI (US); Scott Blehm, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 783 days.

(21) Appl. No.: 12/952,842

(22) Filed: Nov. 23, 2010

(65) Prior Publication Data
US 2012/0125138 A1    May 24, 2012

(51) Int. Cl.
*G01L 3/02* (2006.01)
*G01L 3/00* (2006.01)

(52) U.S. Cl.
USPC ............... 73/862.193; 73/862.191; 73/862.08

(58) Field of Classification Search
USPC .................. 73/862.193, 862.191, 862.08
See application file for complete search history.

(56) References Cited

U.S. PATENT DOCUMENTS

| | | | |
|---|---|---|---|
| 6,289,748 B1 * | 9/2001 | Lin et al. .................. | 73/862.331 |
| 6,776,058 B1 * | 8/2004 | Schroeder ................ | 73/862.333 |
| 6,857,500 B2 * | 2/2005 | Halstead et al. .......... | 180/446 |
| 6,871,553 B2 * | 3/2005 | Naidu et al. ............. | 73/862.331 |
| 7,478,567 B2 * | 1/2009 | Varonis et al. ........... | 73/862.333 |
| 7,493,831 B2 * | 2/2009 | Varonis .................... | 73/862.333 |
| 7,886,863 B2 * | 2/2011 | Marsh et al. ............. | 180/383 |
| 2005/0172732 A1 * | 8/2005 | Feng et al. .............. | 73/862.332 |
| 2009/0027045 A1 * | 1/2009 | Islam et al. .............. | 324/207.13 |
| 2010/0196174 A1 * | 8/2010 | Lee ......................... | 417/410.1 |
| 2011/0126639 A1 * | 6/2011 | Behrens ................... | 73/862.193 |

FOREIGN PATENT DOCUMENTS

| | | | | |
|---|---|---|---|---|
| EP | 1726934 A1 * | 11/2006 | ............... | G01L 3/10 |
| EP | 1916176 A1 * | 4/2008 | ............... | B62D 5/04 |

OTHER PUBLICATIONS

European Search Report; European Application No. 11009233.5; European Filing Date Nov. 22, 2011; Date of Mailing Apr. 4, 2012; 5 pages.

* cited by examiner

*Primary Examiner* — Lisa Caputo
*Assistant Examiner* — Jamel Williams
(74) *Attorney, Agent, or Firm* — Cantor Colburn LLP (57) ABSTRACT

A torque sensing system having a torque sensor, and a steering system, are provided. The torque sensor includes a first rotor having apertures extending therethrough and bar magnets disposed in the apertures. The torque sensor further includes a second rotor defining an interior region with the first rotor being disposed in the interior region. The second rotor has tooth members extending toward the first rotor. The torque sensor further includes first and second Hall effect sensors disposed in an open region of the second rotor proximate to the first rotor. The first and second Hall effect sensors generate first and second signals, respectively, indicative of an amount of torque applied between the first rotor and the second rotor.

22 Claims, 14 Drawing Sheets

TORQUE SENSING SYSTEM HAVING TORQUE SENSOR, AND STEERING SYSTEM

FIELD OF THE INVENTION

The subject invention relates to a torque sensing system, a torque sensor, and a steering system for a vehicle using the torque sensing system.

BACKGROUND

Torque sensors have been utilized in a steering system to measure torque applied to a vehicle handwheel. However, the torque sensors typically utilize ring magnets that are challenging to attach to an upper steering shaft and are relatively expensive to manufacture.

Accordingly, it is desirable to provide an improved torque sensing system having an improved torque sensor.

SUMMARY OF THE INVENTION

In one exemplary embodiment of the invention, a torque sensor is provided. The torque sensor includes a first rotor having a plurality of apertures extending therethrough. The torque sensor further includes a plurality of bar magnets disposed in the plurality of apertures. Each aperture of the plurality of apertures has a respective bar magnet of the plurality of bar magnets therein. The torque sensor further includes a second rotor defining an interior region. The first rotor is rotatably disposed in the interior region. The second rotor has a plurality of tooth members extending radially toward the first rotor. The torque sensor further includes first and second Hall effect sensors disposed in an open region of the second rotor proximate to the first rotor. The first and second Hall effect sensors generate first and second signals, respectively, indicative of an amount of torque applied between the first and second rotors.

In another exemplary embodiment of the invention, a torque sensing system is provided. The torque sensing system includes a torque sensor having a first rotor, a plurality of bar magnets, a second rotor, and first and second Hall effect sensors. The first rotor has a plurality of apertures extending therethrough. The plurality of bar magnets are disposed in the plurality of apertures. Each aperture of the plurality of apertures have a respective bar magnet of the plurality of bar magnets therein. The second rotor defines an interior region. The first rotor is rotatably disposed in the interior region. The second rotor has a plurality of tooth members extending toward the first rotor. The first and second Hall effect sensors are disposed in an open region of the second rotor proximate to the first rotor. The first and second Hall effect sensors generate first and second signals, respectively, indicative of an amount of torque applied between the first and second rotors. The torque sensing system further includes a controller operably communicating with the first and second Hall effect sensors. The controller is configured to determine a torque value corresponding to the amount of torque applied between the first and second rotors based on the first and second signals.

In another exemplary embodiment of the invention, a steering system for a vehicle. The steering system includes an upper steering shaft, a lower steering shaft, and a torque sensor operably coupled to both the upper steering shaft and the lower steering shaft. The torque sensor has a first rotor, a plurality of bar magnets, a second rotor, and first and second Hall effect sensors. The first rotor has a plurality of apertures extending therethrough. The plurality of bar magnets are disposed in the plurality of apertures. Each aperture of the plurality of apertures has a respective bar magnet of the plurality of bar magnets therein. The second rotor defines an interior region. The first rotor is rotatably disposed in the interior region. The second rotor has a plurality of tooth members extending toward the first rotor. The first and second Hall effect sensors are disposed in an open region of the second rotor proximate to the first rotor. The first and second Hall effect sensors generate first and second signals, respectively, indicative of an amount of torque applied between the first and second rotors.

The above features and advantages and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Referring to FIGS. 1-8, a steering system 20 for a vehicle in accordance with the invention is illustrated. The steering system 20 includes an upper steering shaft 30, a torsion bar 32, a torque sensing system 34, and a lower steering shaft 36. The upper steering shaft 30 is coupled to the torsion bar 32 that is further coupled to the lower steering shaft 36.

Figure 3:
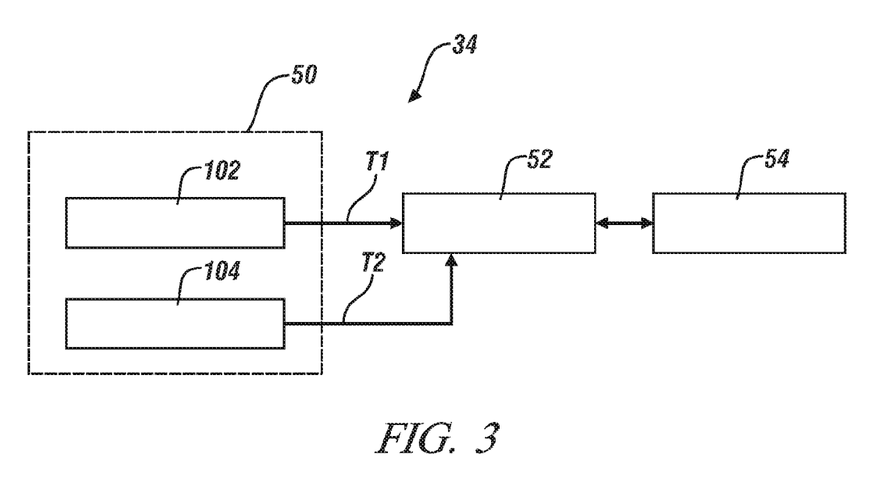
FIG. 3 is a block diagram of a torque sensing system utilized in the steering system of FIG. 1 in accordance with another aspect of the invention.
Figure 4:
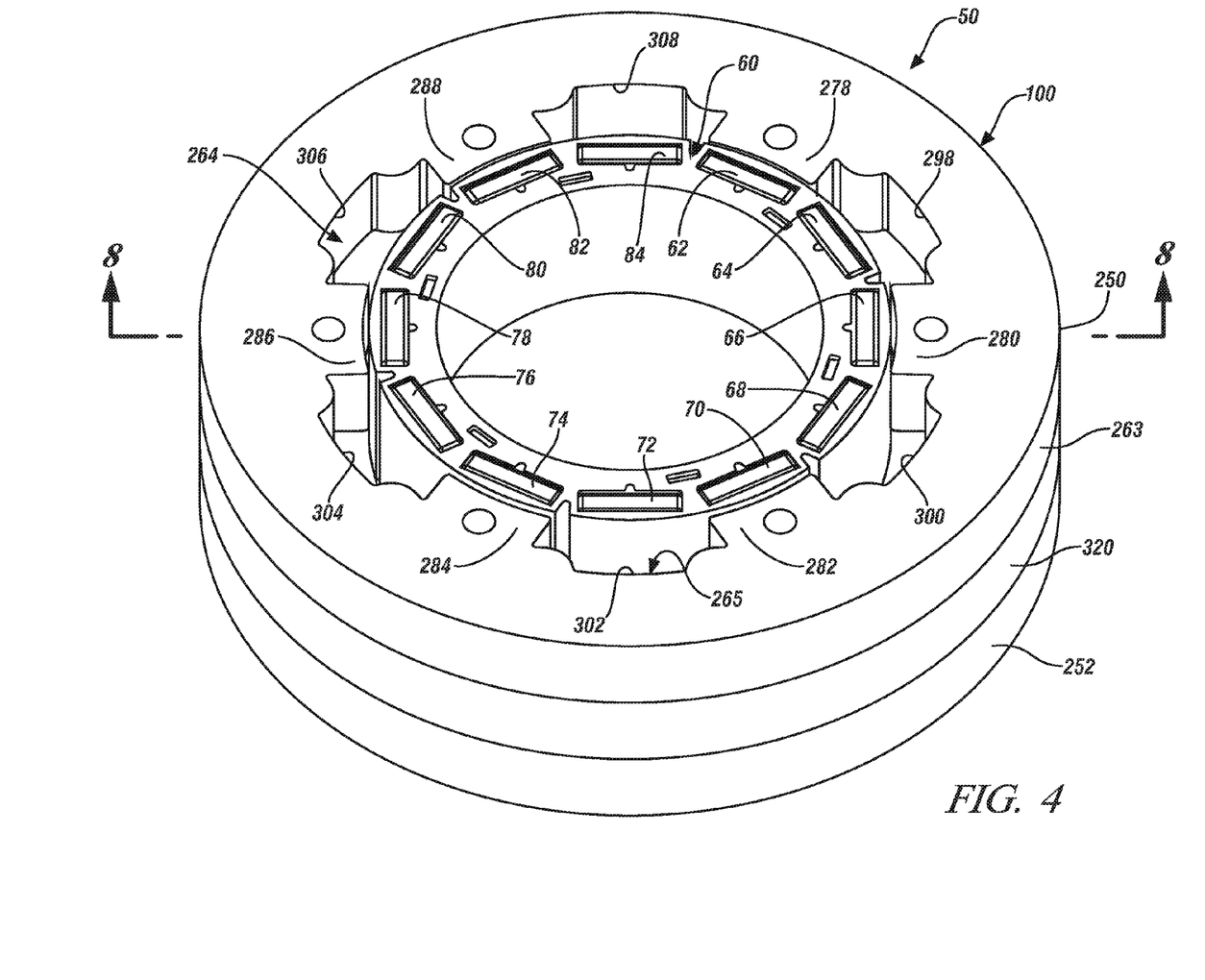
FIG. 4 is a schematic view of a torque sensor utilized in the torque sensing system of FIG. 3 in accordance with yet another aspect of the invention.

Referring to FIGS. 3 and 4, the torque sensing system 34 is provided to measure an amount of rotational torque applied to the torsion bar 32 by a vehicle handwheel in accordance with another aspect of the invention. The torque sensing system 34 includes a torque sensor 50, a controller 52, and a memory device 54. In an exemplary embodiment, the controller 52 is a microprocessor. In alternative embodiments, however, the controller 52 can comprise ASIC devices or other devices known to those skilled in the art for performing arithmetic and logical operations.

Figure 1:
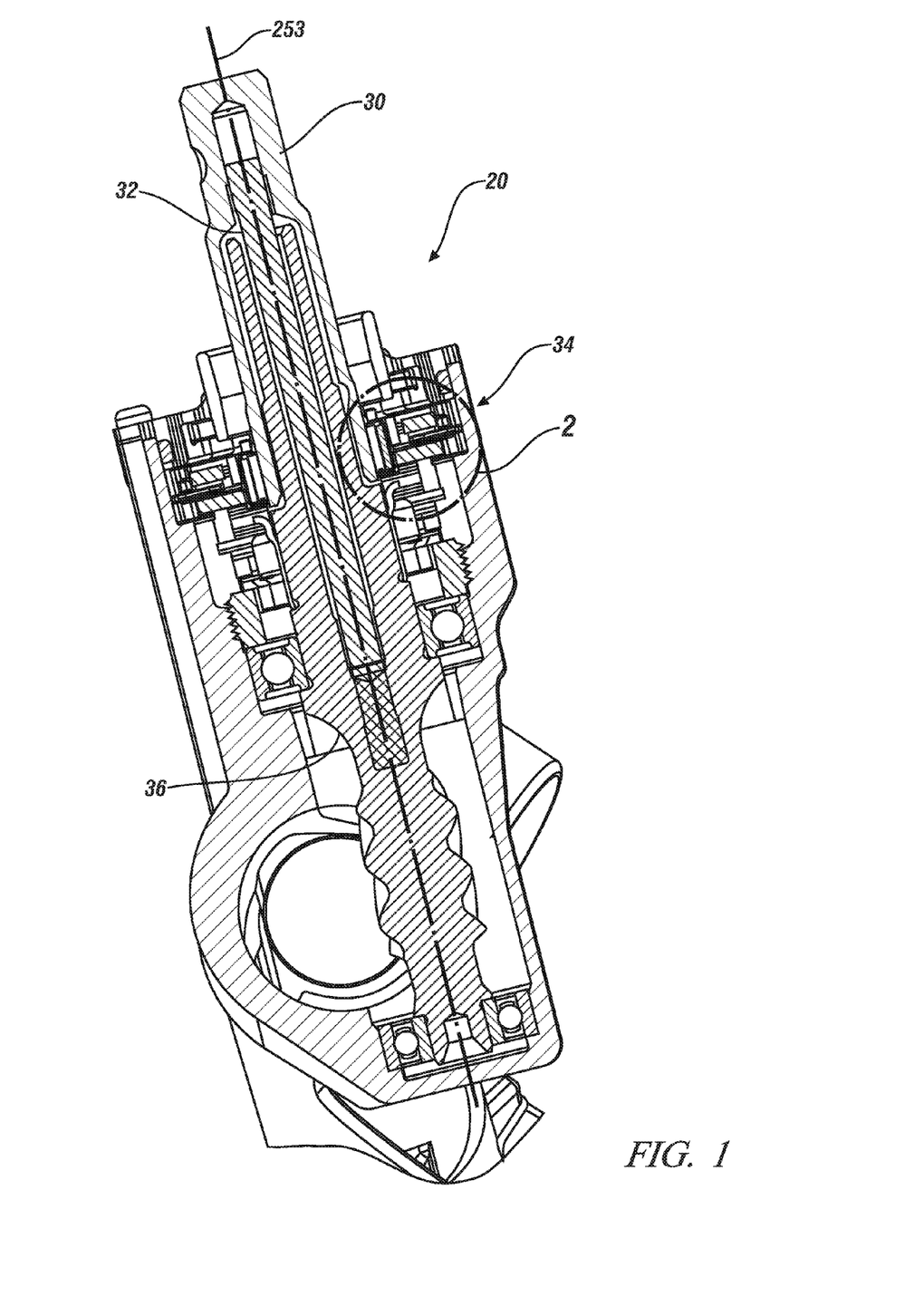
FIG. 1 is cross-sectional schematic view of a steering system for a vehicle in accordance with the invention.
Figure 2:
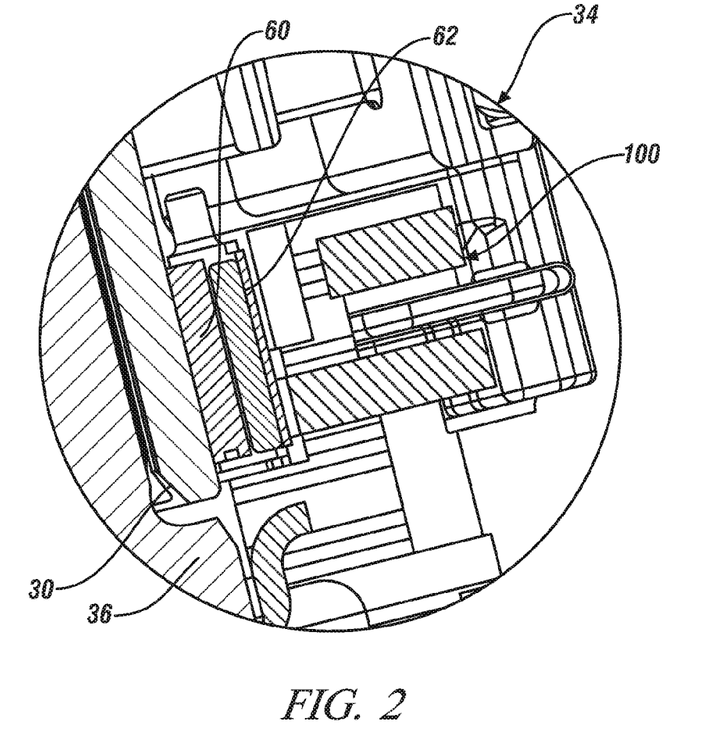
FIG. 2 is an enlarged view of a portion of the steering system of FIG. 1 taken at circle 2.

Referring to FIGS. 1, 2 and 3, the torque sensor 50 is configured to generate first and second signals indicative of an amount of rotational displacement of the torsion bar 32 which is further indicative of an amount of torque applied to the torsion bar 32 (e.g., an amount of torque applied between a first rotor 60 and a second rotor 100 of the torque sensor 50) of the steering system 20 by a vehicle handwheel in accordance with yet another aspect of the invention. The torsion bar 32 is coupled between the upper steering shaft 30 and the lower steering shaft 36. The torque sensor 50 is also coupled to the upper steering shaft 30 and the lower steering shaft 36. The torque sensor 50 includes a generally ring-shaped first rotor 60, bar magnets 62, 64, 66, 68, 70, 72, 74, 76, 78, 80, 82, 84, a second rotor 100, and Hall effect sensors 102, 104.

Figure 5:
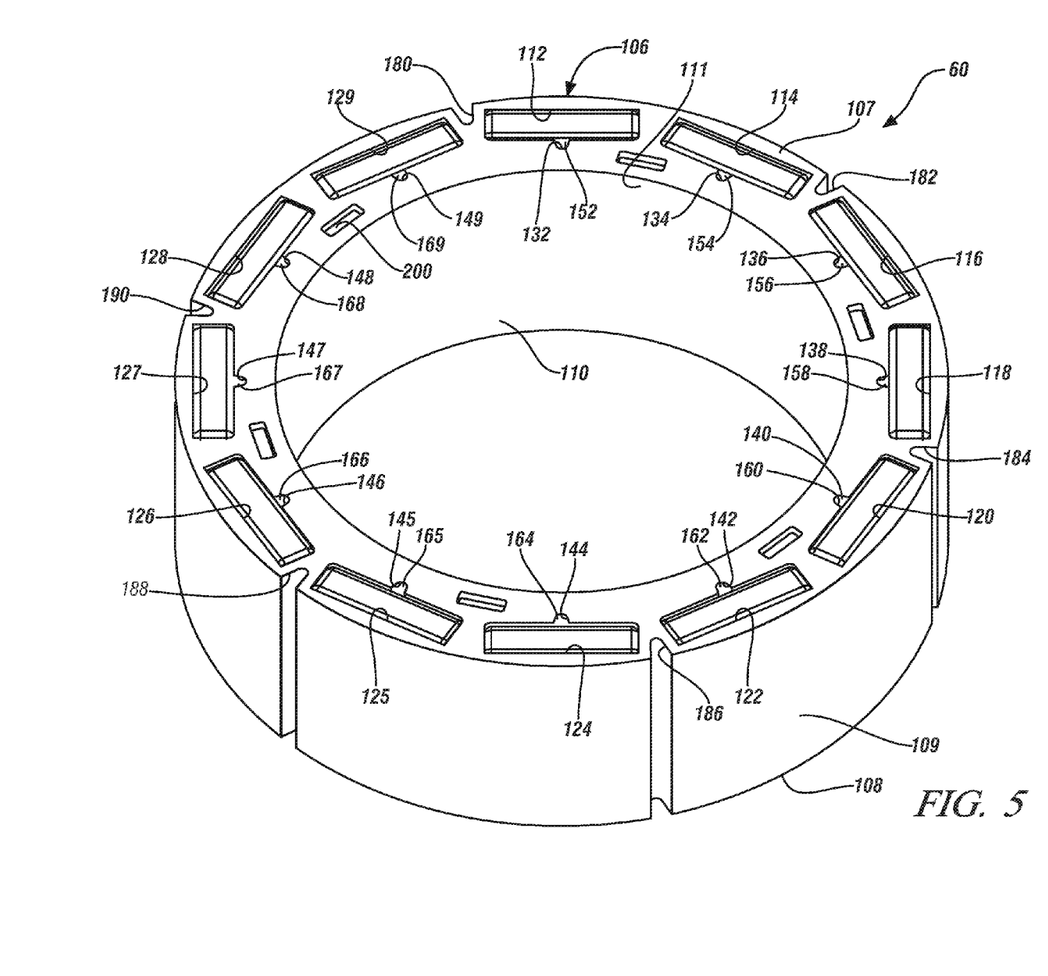
FIG. 5 is a schematic view of a first rotor utilized in the torque sensor of FIG. 4.
Figure 6:
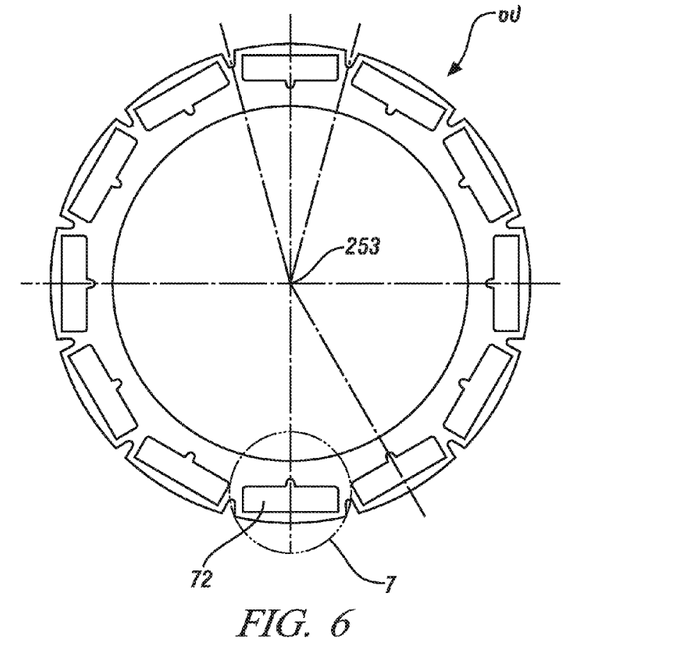
FIG. 6 is a front view of the first rotor of FIG. 5.
Figure 7:
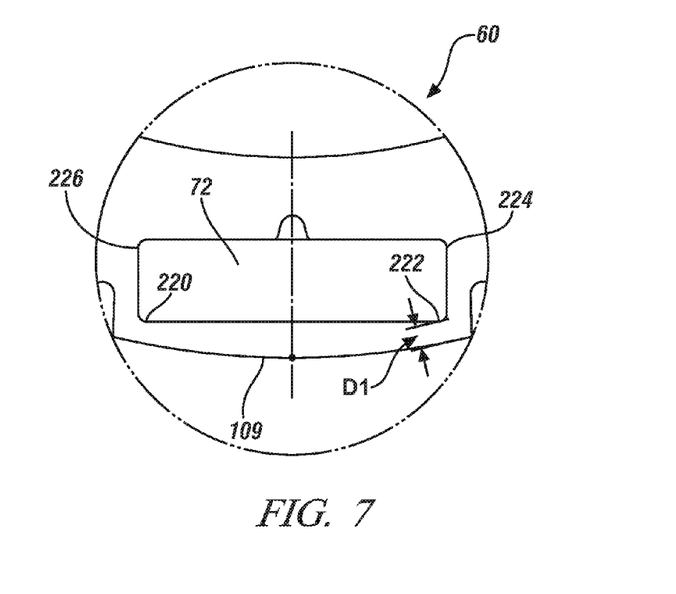
FIG. 7 is an enlarged view of a portion of the first rotor of FIG. 5 taken at circle 7.

Referring to FIGS. 4 and 5, the first rotor 60 includes a body 106 having a central aperture 111 extending therethrough. The central aperture 111 is configured to receive a portion of the upper steering shaft 30 therein. The body 106 is constructed of a plurality of generally ring-shaped plates that are fixedly coupled together. The body 106 includes a top surface 107, a bottom surface 108, an outer circumferential surface 109, and an inner circumferential surface 110. The body 106 further includes apertures 112, 114, 116, 118, 120, 122, 124, 125, 126, 127, 128, 129 extending therethrough for receiving the bar magnets therein. In particular, the apertures 112-129 extend from the top surface 107 to the bottom surface 108. The body 106 further includes grooves 132, 134, 136, 138, 140, 142, 144, 145, 146, 147, 148, 149 extending therethrough that are disposed adjacent to the apertures 112-129, respectively. The first rotor 60 further includes retention members 152, 154, 156, 158, 160, 162, 164, 165, 166, 167, 168, 169 that are disposed in the grooves 132-149, respectively, for retaining corresponding bar magnets within the respective apertures of the body 106. In one exemplary embodiment, the retention members are constructed of plastic. Of course, in alternative embodiments, the retention members could be constructed of other materials known to those skilled in the art. The body 106 further includes grooves 180, 182, 184, 186, 188, 190 extending radially inwardly from the outer circumferential surface 109. Each of the grooves 180-190 have two bar magnets disposed therebetween. Each of the generally ring-shaped plates utilized to form the body 106 includes interlock members such as the interlock member 200 for example, to fixedly couple adjacent plates together.

The bar magnets 62-84 are disposed within the apertures 112-129 respectively, of the ring-shaped first rotor 60. The bar magnets 62-84 are permanent magnets having a generally rectangular cross-sectional shape. The bar magnets 62-84 generate a magnetic flux that flows through the body 106 to the Hall effect sensors 102, 104 that are disposed in the open region 320 between the plates 250, 252 of the second rotor 100. The magnetic flux is detected by the Hall effect sensors 102, 104 and is utilized to determine an angular displacement of the torsion bar 32 coupled between the first rotor 60 and the second rotor 100, and the amount of angular displacement is utilized to determine an amount of torque applied to the torsion bar 32 (e.g., an amount of torque applied between the first rotor 60 and the second rotor 100). Adjacent bar magnets of bar magnets 62-84 have opposite magnetic polarities. For example, the bar magnet 84 has an opposite magnetic polarity than a magnetic polarity of the bar magnet 62. Because each of the bar magnets 62-84 have a substantially similar structure, only the bar magnet 72 will be described in further detail below with reference to FIGS. 6 and 7. As illustrated, the bar magnet 72 has arcuate-shaped edge portions 220, 222, 224, 226. A distance between the arcuate-shaped edge portion 220 and the outer circumferential surface 109 of the ring-shaped first rotor 60 is within a range of 0.25-1.0 millimeters. Similarly, a distance "D1" between the arcuate-shaped edge portion 222 and the outer circumferential surface 109 is within a range of 0.25-1.0 millimeters.

Referring to FIGS. 1, 4, 6 and 8, the second rotor 100 defines an interior region or aperture 264 configured to receive the first rotor 60 therein. The second rotor 100 is coupled to the lower steering shaft 36 and rotates with the lower steering shaft 36, and the first rotor 60 is coupled to the upper steering shaft 30 and rotates with the upper steering shaft 30. The torsion bar 32 is coupled between the upper steering shaft 30 and the lower steering shaft 36, about a central axis 253.

Figure 8:
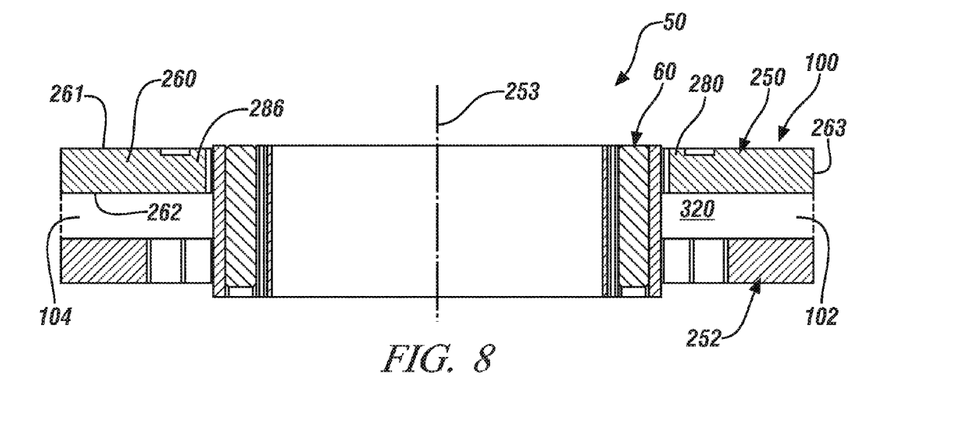
FIG. 8 is a cross-sectional schematic of the torque sensor of FIG. 4 taken at line 8-8.

The second rotor 100 is constructed of ring-shaped plates 250, 252. The ring-shaped plates 250, 252 are coupled together by a plastic layer that is disposed in a portion of the open region 320 between the plates 250, 252. The ring-shaped plate 250 includes a body 260 having a top surface 261, a bottom surface 262, an outer circumferential surface 263, and an inner circumferential surface 265. The body 260 defines tooth members 278, 280, 282, 284, 286, 288 extending radially inwardly from the inner circumferential surface 265. The tooth members 278-288 are spaced apart from one another and define gaps 298, 300, 302, 304, 306, 308 therebetween. The tooth members 278-288 do not have electrical coils disposed thereon since doing so would adversely effect the magnetic coupling of the tooth members with the bar magnets. The ring-shaped plate 252 has a substantially similar configuration as the plate 250 and is spaced apart from the plate 252 to define an open region 320 therebetween. The ring-shaped plate 252 is also centered about the central axis 253 and has tooth members offset a predetermined number of degrees from the tooth members 278-280. The predetermined number of degrees is determined utilizing the following equation: predetermined number of degrees=(360°/(2*number of teeth in the ring-shaped plate 250).

The Hall effect sensors 102, 104 are disposed in the open region 320 between the ring-shaped plates 250, 252 of the second rotor 100. The Hall effect sensors 102, 104 generate first and second signals, respectively, indicative of an amount of rotational displacement of the torsion bar 32 coupled between the first rotor 60 and the second rotor 100, which is further indicative of an amount of torque being applied to the torsion bar 32. The Hall effect sensors 102, 104 generate the first and second signals, respectively, in response to receiving magnetic flux from the bar magnets 62-84 as the bar magnets 62-84 are rotated about the central axis 253. The Hall effect sensors 102, 104 are disposed a predetermined number of degrees apart from one another relative to the central axis 253 of the first rotor 60. In the illustrated embodiment, the Hall effect sensors 102, 104 are disposed 150° apart from one another relative to the central axis 253 of the first rotor 60. Of course, in alternative embodiments, the predetermined number of degrees between the Hall effect sensors 102, 104 could be greater than or less than 150°.

Figure 9:
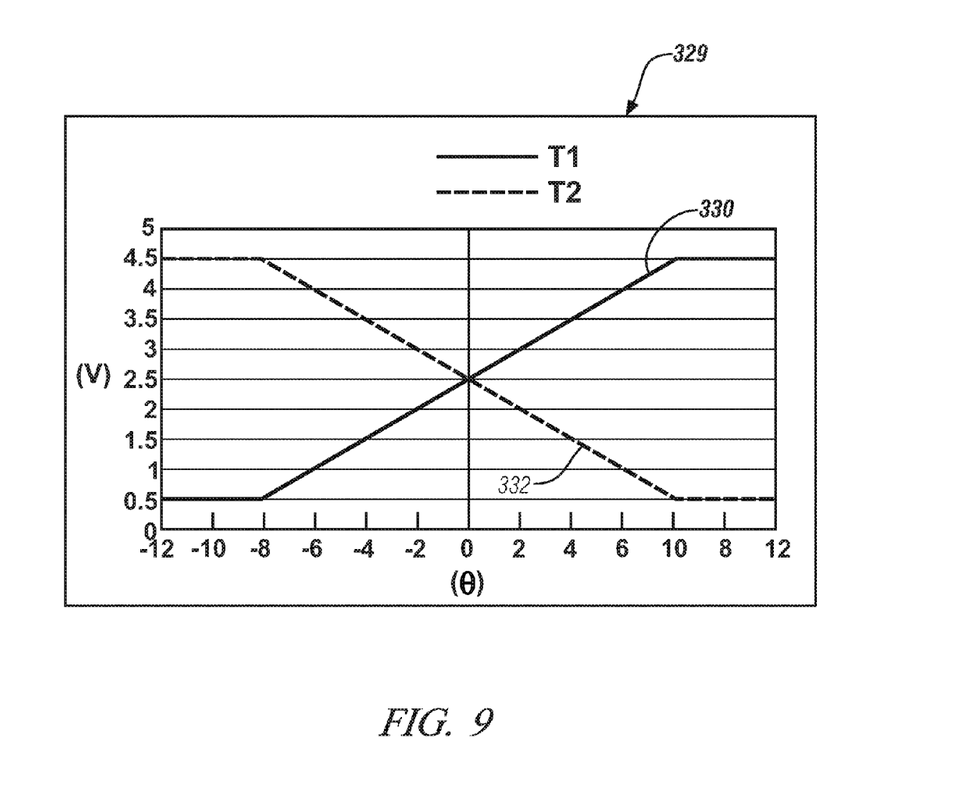
FIG. 9 is a graph of two signal curves indicating voltages utilized to determine amounts of torque by the torque sensing system of FIG. 3.
Figure 10:
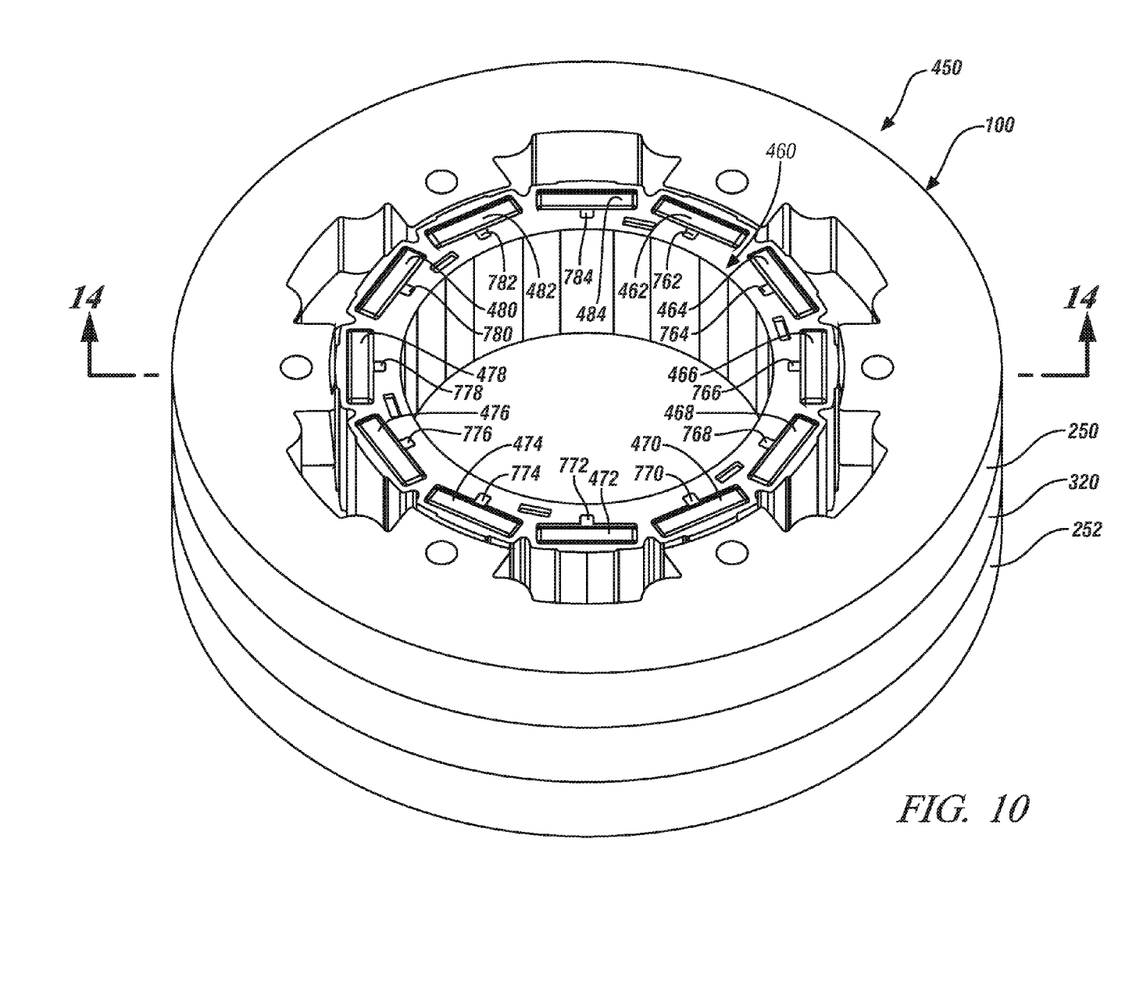
FIG. 10 is a schematic view of another torque sensor in accordance with another aspect of the invention.

Referring to FIG. 9, a graph 329 having curves 330, 332 corresponding to the first and second signals T1, T2, respectively, generated by the Hall effect sensors 102, 104, respectively, are illustrated. The graph has a Y-axis corresponding to a sensor signal amplitude in volts, and an X-axis corresponding to an angle Θ in degrees. The curves 330, 332 correspond to voltages indicative of amounts of torque being applied to the torsion bar 32 coupled between the first rotor 60 and the second rotor 100.

Referring to FIG. 3, the controller 52 is configured to receive the first and second signals from the Hall effect sensors 102, 104, respectively, and to determine a rotational displacement value (e.g., first signal−second signal) indicative of an amount of rotational displacement of the torsion bar 32 based on relative rotational movement of the upper steering shaft 30 and the lower steering shaft 36 which are both coupled to opposite ends of the torsion bar 32. The rotational displacement of the rotors 60, 100 relative to one another correspond to the rotational displacement of the torsion bar 32. The controller 52 is further configured to determine a torque value based on the first and second signals, respectively. For example, in the illustrated embodiment, the controller 52 calculates a torque value utilizing the following equation: torque value=((first signal−second signal)*2*torsion bar compliance value). The units of measure of the torsion bar compliance value is Newton-meters per degree of rotation of the torsion bar. Of course, other equations known to those skilled in the art could be utilized. The controller 52 is further configured to store the torque value in the memory device 54. In one exemplary embodiment, the memory device 54 is a nonvolatile memory.

Referring to FIGS. 1 and 10-14, another torque sensor 450 that can be utilized to determine an amount of torque applied to the torsion bar 32 in accordance with another aspect of the invention is illustrated. The torque sensor 450 can replace the torque sensor 50 in the torque sensing system 34. In particular, the torque sensor 450 is configured to generate first and second signals indicative of an amount of rotational displacement of the torsion bar 32 which is further indicative of an amount of torque applied to the torsion bar 32 coupled between the upper steering shaft 30 and the lower steering shaft 36 of the steering system 20. The torque sensor 450 is disposed on the upper steering shaft 30 and the lower steering shaft 36. The torque sensor 450 includes a generally ring-shaped first rotor 460, bar magnets 462, 464, 466, 468, 470, 472, 474, 476, 478, 480, 482, 484, the second rotor 100, and the Hall effect sensors 102, 104.

Figure 11:
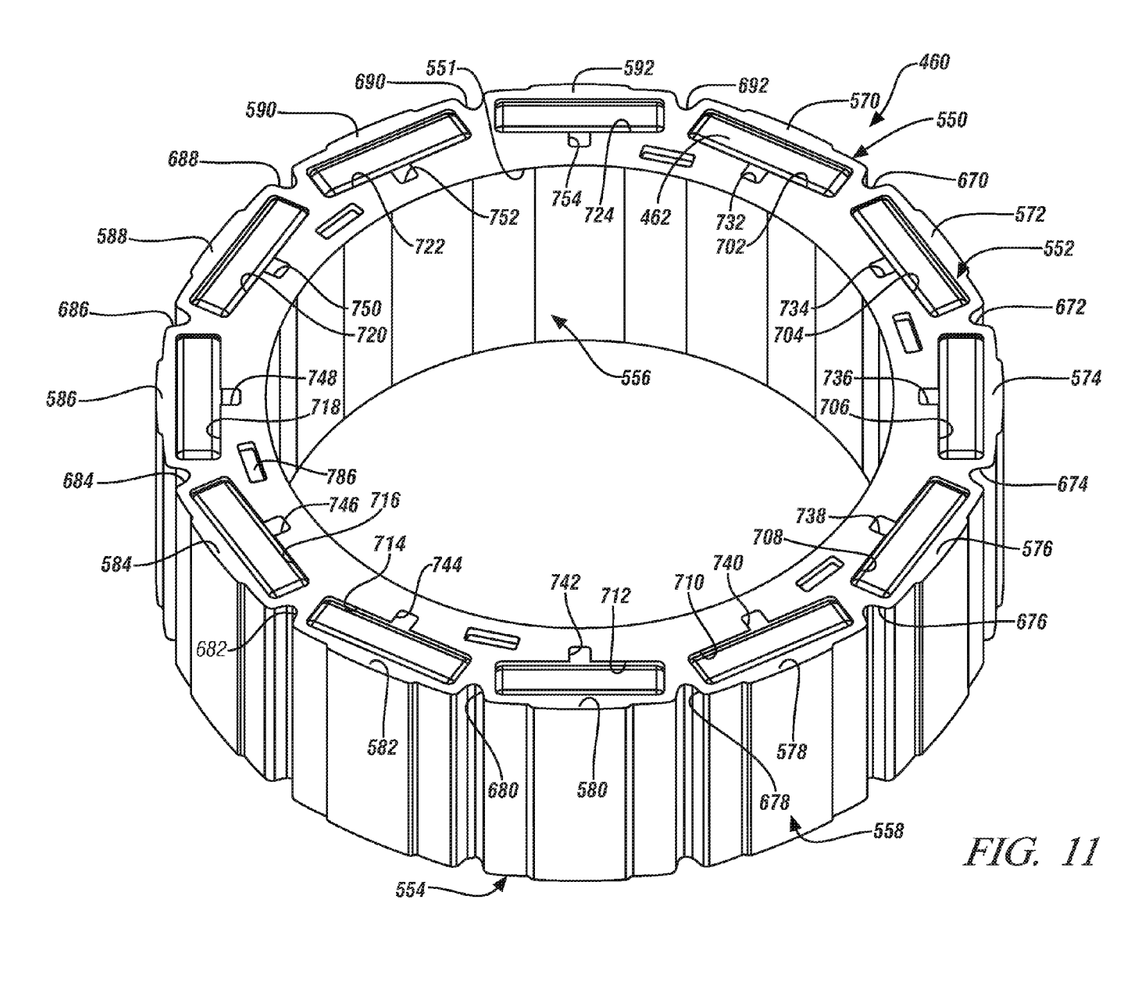
FIG. 11 is a schematic of a first rotor utilized in the torque sensor of FIG. 10.

The torque sensor 450 utilizes a first rotor 460 that has a different design as compared to the first rotor 60 of the torque sensor 50. As illustrated in FIG. 11, the first rotor 460 includes a body 550 having a central aperture 551, a top surface of 552, a bottom surface 554, an inner circumferential surface 556, and an outer surface 558.

Figure 12:
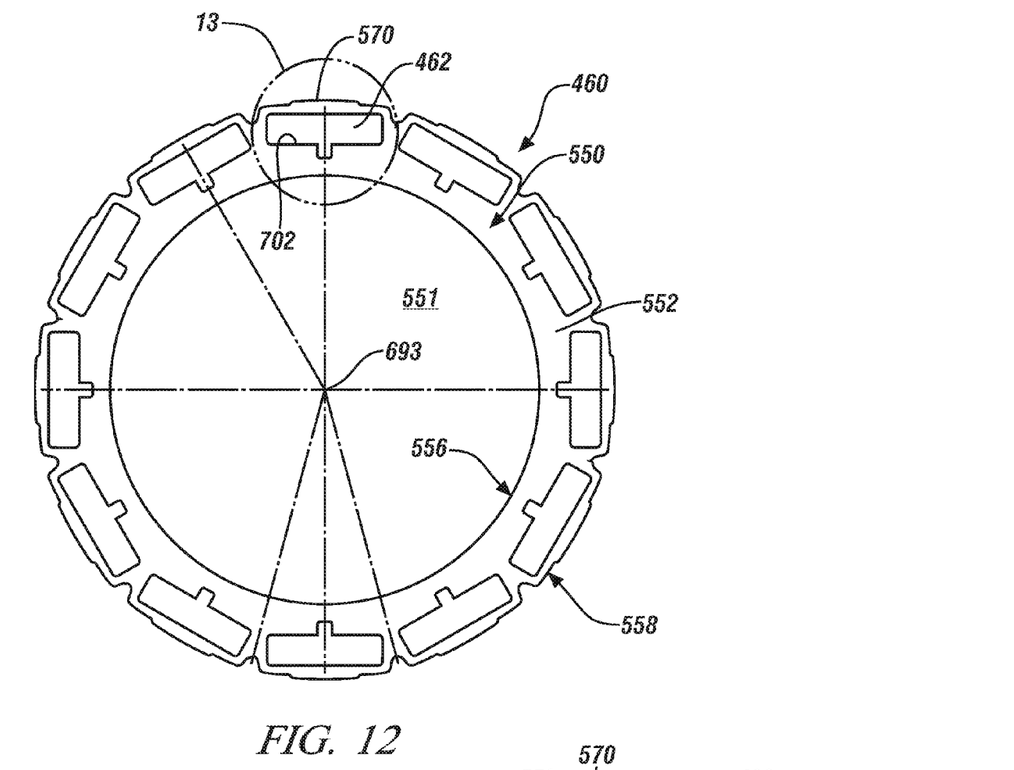
FIG. 12 is a front view of the first rotor of FIG. 11.
Figure 13:
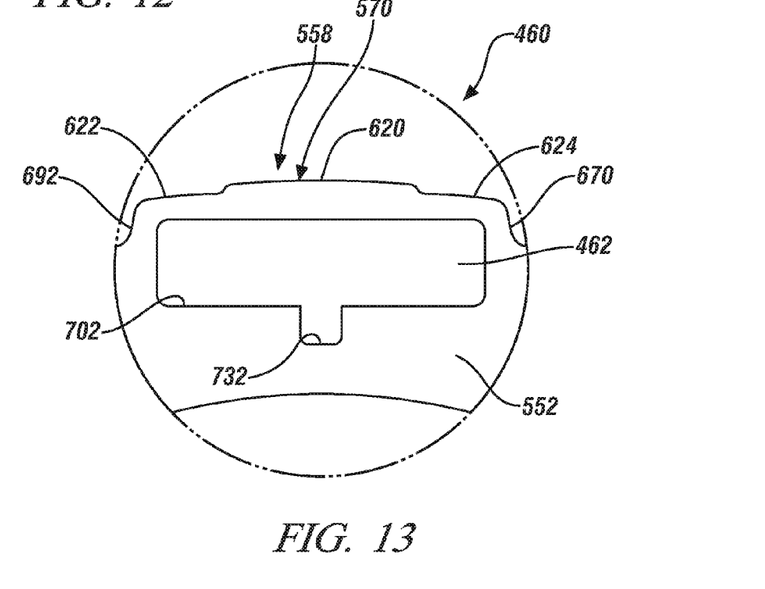
FIG. 13 is an enlarged view of a portion of the first rotor of FIG. 12 taken at circle 13.

Referring to FIGS. 11-13, the outer surface 558 defines step portions 570, 572, 574, 576, 578, 580, 582, 584, 586, 588, 590, 592. Since the step portions 570-592 have a substantially similar configuration to one other, only the step portion 570 will be described in greater detail below. The step portion 570 includes a central raised step surface 620, and lower step surfaces 622, 624 disposed on opposite ends of the surface 620. The bar magnet 462 has magnetic flux that is directed through the central raised step surface 620 towards at least one tooth of the second rotor 100.

The first rotor 460 further includes grooves 670, 672, 674, 676, 678, 680, 682, 684, 686, 688, 690, 692 extending radially inwardly from the outer surface 558 toward the central axis 693. Each pair of grooves has one bar magnet disposed therebetween.

The body 550 is constructed of a plurality of generally ring-shaped plates that are fixedly coupled together. The body 550 further includes apertures 702, 704, 706, 708, 710, 712, 714, 716, 718, 720, 722, 724 extending therethrough for receiving bar magnets therein. In particular, the apertures 702-724 extend from the top surface 552 to the bottom surface 554. The body 550 further includes grooves 732, 734, 736, 738, 740, 742, 744, 746, 748, 750, 752, 754 extending therethrough that are disposed adjacent to the apertures 702-724, respectively. The first rotor 460 further includes retention members 762, 764, 766, 768, 770, 772, 774, 776, 778, 780, 782, 784 that are disposed in the grooves 732-754, respectively, for retaining corresponding bar magnets within the respective apertures of the body 550. In one exemplary embodiment, the retention members are constructed of plastic. In alternative embodiments, the retention members could be constructed of other suitable materials known to those skilled in the art. Each of the generally ring-shaped plates utilized to form the body 550 includes interlock members such as the interlock member 786 for example, to fixedly couple adjacent plates together.

Figure 14:
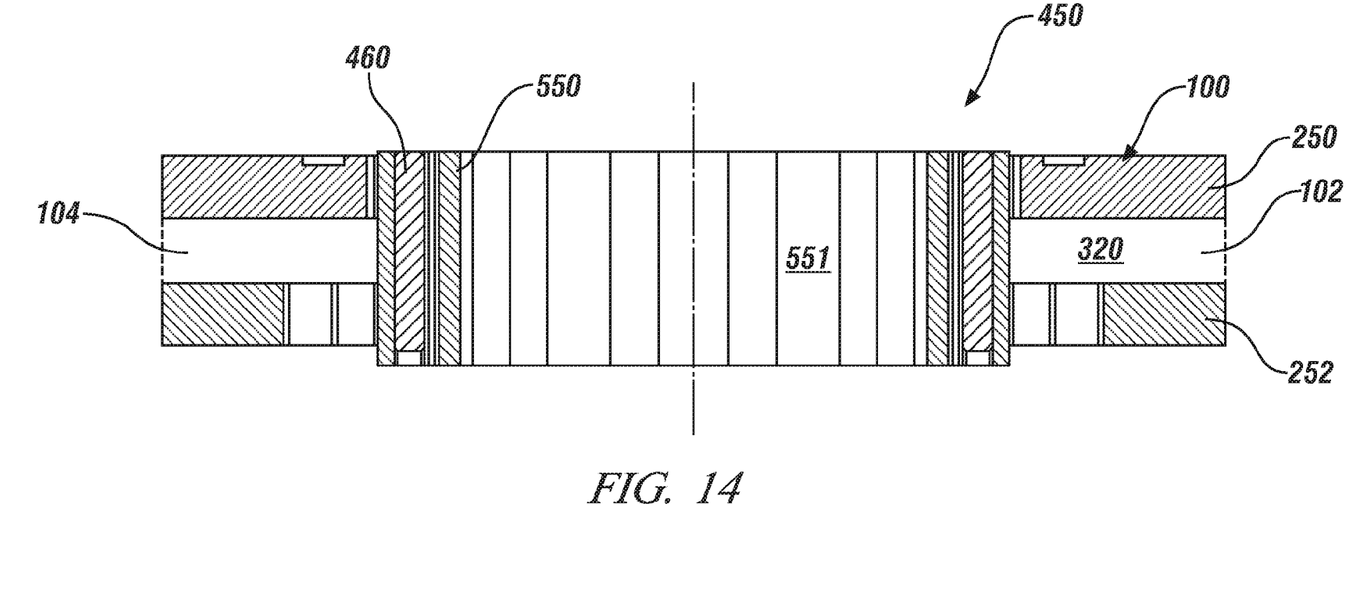
FIG. 14 is a cross-sectional schematic view of the torque sensor of FIG. 10 taken at line 14-14.

The bar magnets 462-484 are disposed within the apertures 702-724 respectively, of the ring-shaped first rotor 460. The bar magnets 702-724 are permanent magnets having a generally rectangular cross-sectional shape. Each of the bar magnets 702-724 generate a magnetic flux that flows through the body 550 to the Hall effect sensors 102, 104 that are disposed in the open region 320 between the plates 250, 252 of the second rotor 100. Adjacent bar magnets have opposite magnetic polarities. For example, the bar magnet 482 has an opposite magnetic polarity than a magnetic polarity of the bar magnet 462.

The Hall effect sensors 102, 104 generate first and second signals, respectively indicative of an amount of rotational displacement of the torsion bar 32 by the upper steering shaft 30, which is further indicative of an amount of torque applied to the torsion bar 32 (e.g., the amount of torque applied between the first rotor 460 and the second rotor 100). The Hall effect sensors 102, 104 generate the first and second signals, respectively, in response to receiving magnetic flux from the bar magnets 462-484 as the bar magnets 462-484 are rotated about the central axis 693.

Referring to FIGS. 1 and 15-19, another torque sensor 850 that can be utilized to determine an amount of rotational displacement of the torsion bar 32 which is further indicative of an amount of torque applied to the torsion bar 32 by the upper steering shaft 30 in accordance with another aspect of the invention is illustrated. The torque sensor 850 can replace the torque sensor 50 in the torque sensing system 34.

Figure 15:
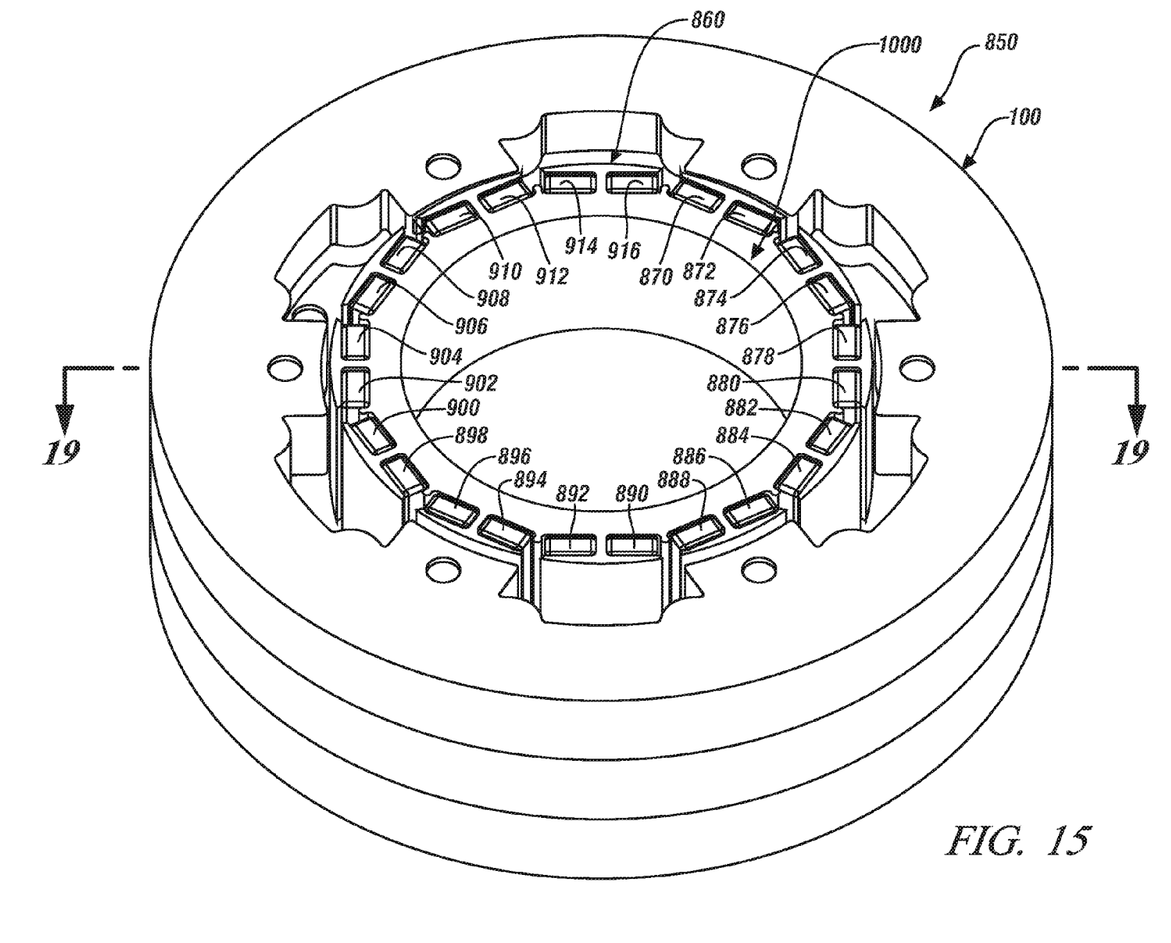
FIG. 15 is a schematic view of another torque sensor in accordance with still another aspect of the invention.

In particular, the torque sensor 850 is configured to generate first and second signals indicative of an amount of rotational displacement of the torsion bar 32 which is further indicative of an amount of torque applied to the torsion bar 32 coupled to the upper steering shaft 30 and the lower steering shaft 36 of the steering system 20. The torque sensor 850 includes a generally ring-shaped first rotor 860, bar magnets 870, 872, 874, 876, 878, 880, 882, 884, 886, 888, 890, 892, 894, 896, 898, 900, 902, 904, 906, 908, 910, 912, 914, 916, and the Hall effect sensors 102, 104.

Figure 16:
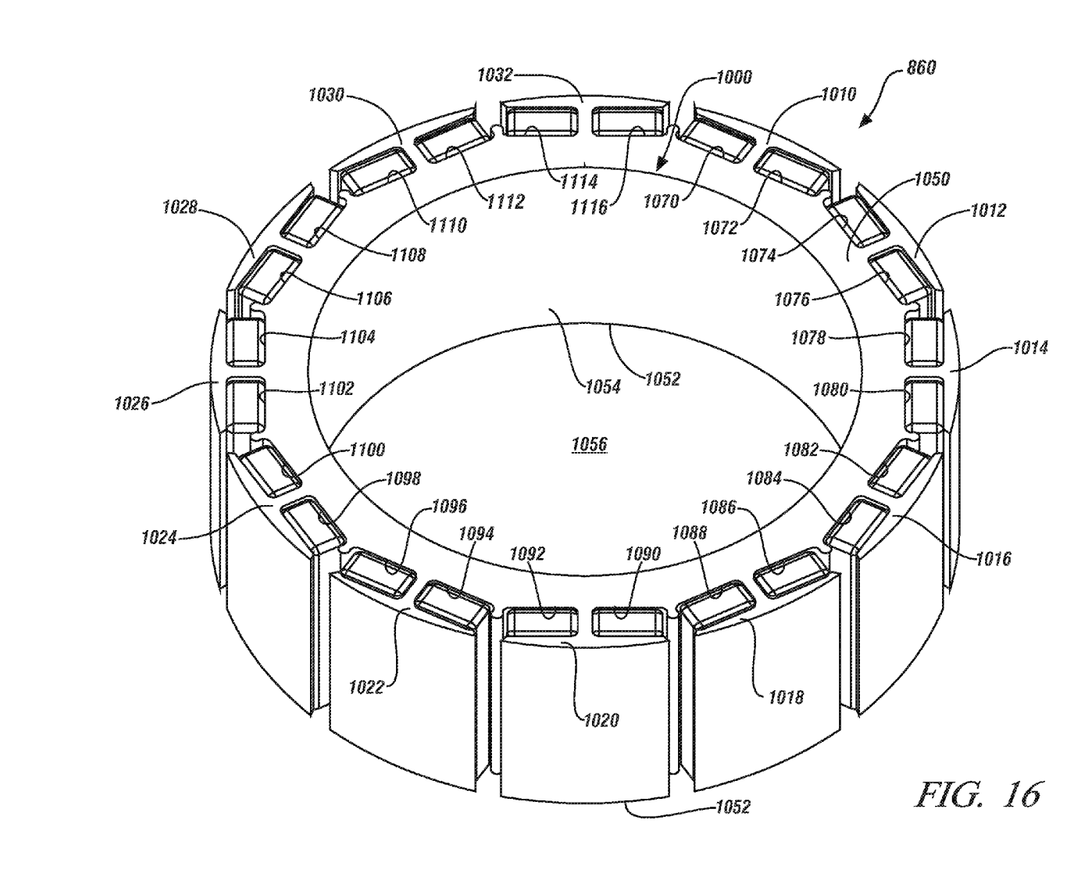
FIG. 16 is a schematic view of a first rotor utilized in the torque sensor of FIG. 15.

The torque sensor 850 utilizes a first rotor 860 that has a different design as compared to the first rotor 60 of the torque sensor 50. As illustrated, the first rotor 860 includes a ring-shaped body 1000 and T-shaped portions 1010, 1012, 1014, 1016, 1018, 1020, 1022, 1024, 1026, 1028, 1030, 1032 extending radially outwardly from the body 1000. The T-shaped portions 1010-1032 are disposed apart from one another circumferentially around the body 1000. The first rotor 860 further includes a top surface 1050, a bottom surface 1052, an inner circumferential 1054, and a central aperture 1056.

Figure 17:
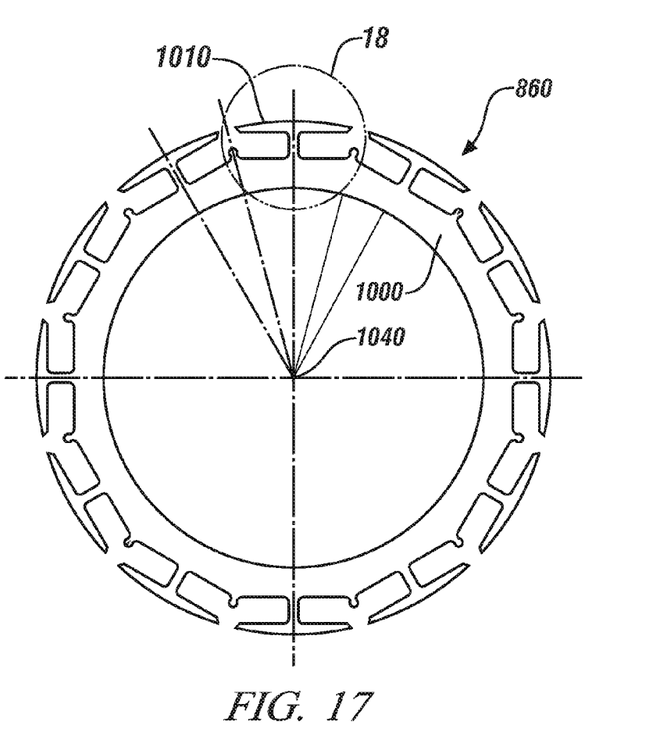
FIG. 17 is a front view of the first rotor of FIG. 16.
Figure 18:
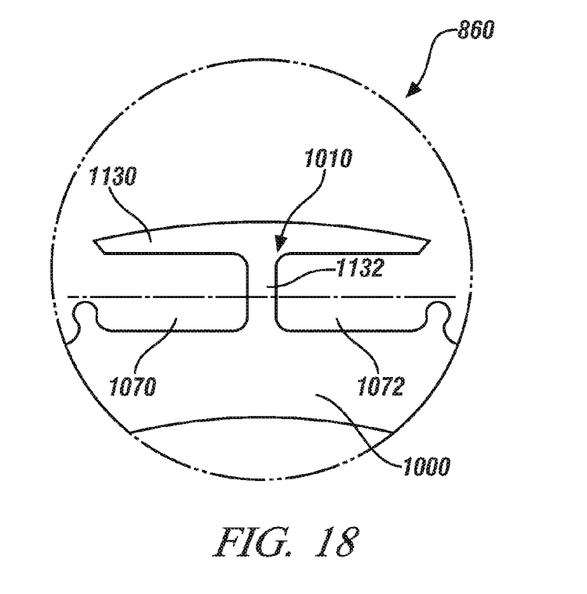
FIG. 18 is an enlarged view of a portion of the first rotor of FIG. 17 taken at circle 18.

Because the T-shaped portions have a substantially similar configuration to one another, only the T-shaped portion 1010 will be described in greater detail below. The T-shaped portion 1010 includes an upper portion 1130 and a central shaft portion 1132. The central shaft portion 1132 extends radially outwardly from the body 1000. The upper portion 1130 is disposed on the outer end of the central shaft portion 1132 in a substantially perpendicular orientation to the portion 1132.

The T-shaped portion 1010 defines apertures 1070, 1072 for receiving the bar magnets 870, 872, respectively, therein; and the T-shaped portion 1012 defines apertures 1074, 1076 for receiving the bar magnets 874, 876, respectively, therein. The T-shaped portion 1014 defines apertures 1078, 1080 for receiving the bar magnets 878, 880, respectively, therein; and the T-shaped portion 1016 defines apertures 1082, 1084 for receiving the bar magnets 882, 884, respectively, therein. The T-shaped portion 1018 defines apertures 1086, 1088 for receiving the bar magnets 886, 888, respectively, therein; and the T-shaped portion 1020 defines apertures 1090, 1092 for receiving the bar magnets 890, 892, respectively, therein. The T-shaped portion 1022 defines apertures 1094, 1096 for receiving the bar magnets 894, 896, respectively, therein; and the T-shaped portion 1024 defines apertures 1098, 1100 for receiving the bar magnets 898, 900, respectively, therein. The T-shaped portion 1026 defines apertures 1102, 1104 for receiving the bar magnets 902, 904, respectively, therein; and the T-shaped portion 1028 defines apertures 1106, 1108 for receiving the bar magnets 906, 908, respectively, therein. The T-shaped portion 1030 defines apertures 1110, 1112 for receiving the bar magnets 910, 912, respectively, therein; and the T-shaped portion 1032 defines apertures 1114, 1116 for receiving the bar magnets 914, 916, respectively, therein.

Figure 19:
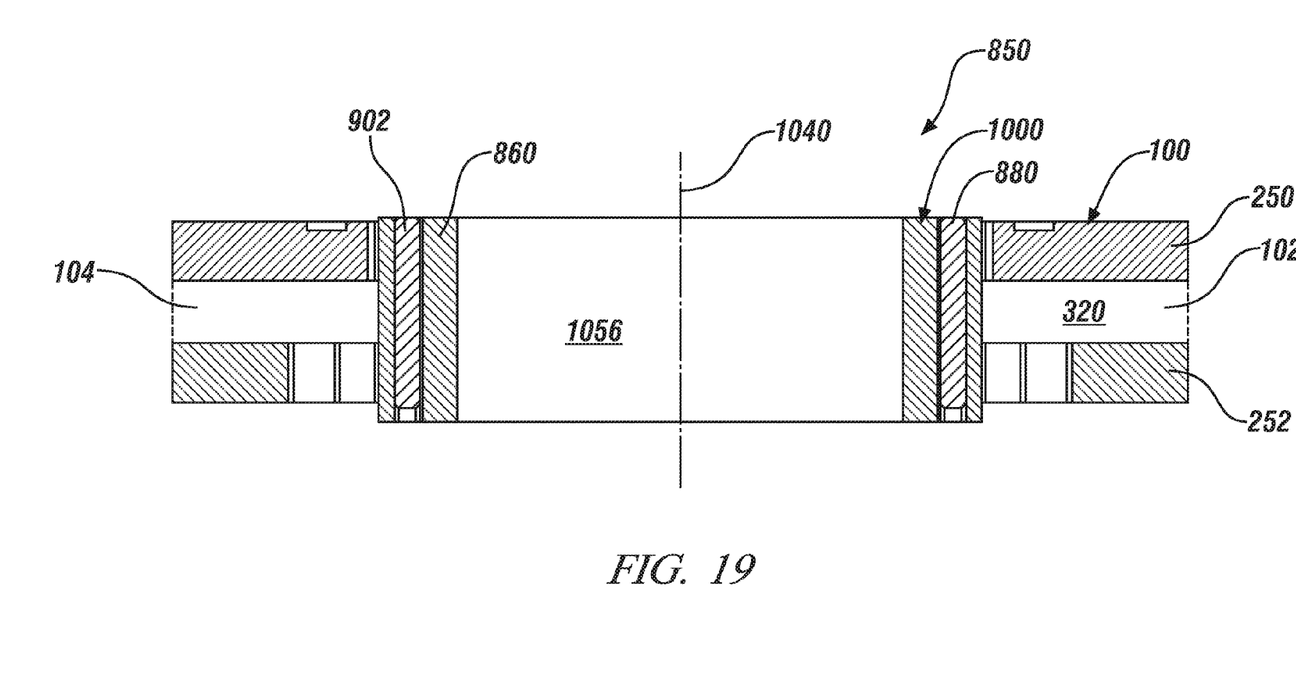
FIG. 19 is a cross-sectional schematic view of the torque sensor of FIG. 15 taken at line 19-19.

The bar magnets 870-916 are permanent magnets having a generally rectangular cross-sectional shape. Each of the bar magnets 870-916 generate a magnetic flux that flows through the T-shaped portions 1010-1032 to the Hall effect sensors 102, 104 that are disposed in the open region 320 between the plates 250, 252 on the second rotor 100. Each pair of adjacent bar magnets that are coupled to a respective T-shaped portion have identical magnetic polarities. For example, the bar magnets 914, 916 have identical magnetic polarities with one another. Further, first and second bar magnets coupled to a first T-shaped portion have identical magnetic polarities that are opposite the magnetic polarities of third and fourth bar magnets coupled to a second T-shaped portion disposed adjacent to the first T-shaped portion. For example, the bar magnets 914, 916 have identical magnetic polarities that are opposite the magnetic polarities of the bar magnets 870, 872. The Hall effect sensors 102, 104 generate first and second signals T1, T2, respectively indicative of an amount of rotational displacement of the torsion bar 32 which is further indicative of an amount of torque applied to the torsion bar 32. The Hall effect sensors 102, 104 generate the first and second signals, respectively, in response to receiving magnetic flux from the bar magnets 870-916 as the bar magnets 870-916 are rotated about the central axis 1040.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A torque sensor, comprising:
    a first rotor comprising a plurality of plates coupled together, the plurality of plates forming a first rotor body that has an inner circumferential surface and an outer circumferential surface and that defines a plurality of apertures that extend through the first rotor body inward from the outer circumferential surface;
    a plurality of bar magnets disposed in the plurality of apertures, each aperture of the plurality of apertures having a respective bar magnet of the plurality of bar magnets therein;
    a second rotor defining an interior region, the first rotor being rotatably disposed in the interior region, the second rotor having a plurality of tooth members extending radially toward the first rotor; and
    first and second Hall effect sensors disposed in an open region of the second rotor proximate to the first rotor, the first and second Hall effect sensors generating first and second signals, respectively, indicative of an amount of torque applied between the first and second rotors.

2. The torque sensor of claim 1, wherein each bar magnet has first and second edge portions that are disposed at a predetermined distance inward from the outer circumferential surface of the first rotor body.

3. The torque sensor of claim 2, wherein the predetermined distance is 0.25-1.0 millimeters.

4. The torque sensor of claim 1, wherein the first rotor body has a top surface and a bottom surface, each aperture extending from the top surface to the bottom surface.

5. The torque sensor of claim 1, wherein the second rotor includes first and second ring-shaped plates, the first ring-shaped plate having a first portion of the plurality of tooth members therein, the second ring-shaped plate having a second portion of the plurality of tooth members therein, the first portion of the plurality of tooth members being angularly offset a predetermined number of degrees from the second portion of the plurality of tooth members, about a central axis of the first and second rotors.

6. The torque sensor of claim 1, wherein the second rotor includes first and second ring-shaped plates disposed apart from one another such that the open region is located between the first and second ring-shaped plates, each of the first and second ring-shaped plates having a portion of the plurality of tooth members thereon.

7. The torque sensor of claim 1, wherein the first and second Hall effect sensors are disposed a predetermined number of degrees apart from one another relative to a central axis of the first rotor.

8. The torque sensor of claim 1, wherein the first rotor further includes a plurality of grooves disposed proximate to the plurality of apertures, each groove of the plurality of grooves being disposed adjacent to one aperture of the plurality of apertures.

9. The torque sensor of claim 8, further comprising a plurality of plastic retention members disposed in the plurality of grooves for axially retaining the plurality of bar magnets in the plurality of apertures of the first rotor.

10. The torque sensor of claim 1, wherein each adjacent pair of bar magnets of the plurality of bar magnets has an opposite magnetic polarity with respect to one another.

11. The torque sensor of claim 1, wherein the outer circumferential surface of the first rotor body has a plurality of stepped portions, each stepped portion of the plurality of stepped portions being disposed adjacent to a respective bar magnet, each stepped portion of the plurality of stepped portions having a central raised step surface and first and second lower step surfaces disposed on opposite sides of the central raised step surface, such that magnetic flux from each respective bar magnet propagates through the central raised step surface and toward the second rotor.

12. The torque sensor of claim 1, wherein the first rotor has a plurality of T-shaped portions disposed circumferentially about the first rotor, each T-shaped portion having first and second apertures of the plurality of apertures disposed radially inwardly of an outer circumferential surface of the respective T-shaped portion.

13. The torque sensor of claim 12, wherein first and second bar magnets of the plurality of bar magnets are disposed in the first and second apertures, respectively, and have magnetic flux that propagates through the respective T-shaped portion toward the second rotor, the first and second bar magnets having identical magnetic polarities.

14. The torque sensor of claim 12, wherein first and second bar magnets of the plurality of bar magnets coupled to a first T-shaped portion have identical magnetic polarities.

15. The torque sensor of claim 14, wherein third and fourth bar magnets of the plurality of bar magnets coupled to a second T-shaped portion which is adjacent to the first T-shaped portion have magnetic polarities opposite the magnetic polarities of the first and second bar magnets.

16. A torque sensing system, comprising:
a torque sensor having a first rotor, a plurality of bar magnets, a second rotor, and first and second Hall effect sensors, the first rotor comprising a plurality of plates coupled together, the plurality of plates forming a first rotor body that has an inner circumferential surface and an outer circumferential surface and that defines a plurality of apertures that extend through the first rotor body inward from the outer circumferential surface, the plurality of bar magnets disposed in the plurality of apertures, each aperture of the plurality of apertures having a respective bar magnet of the plurality of bar magnets therein, the second rotor defining an interior region, the first rotor being rotatably disposed in the interior region, the second rotor having a plurality of tooth members extending toward the first rotor, the first and second Hall effect sensors disposed in an open region of the second rotor proximate to the first rotor, the first and second Hall effect sensors generating first and second signals, respectively, indicative of an amount of torque applied between the first and second rotors; and
a controller operably communicating with the first and second Hall effect sensors, the controller configured to determine a torque value corresponding to the amount of torque applied between the first and second rotors based on the first and second signals.

17. The torque sensing system of claim 16, wherein each bar magnet has first and second edge portions that are disposed at a predetermined distance inward from the outer circumferential surface of the first rotor body.

18. The torque sensing system of claim 17, wherein the predetermined distance is 0.25-1.0 millimeters.

19. The torque sensing system of claim 16, wherein the first rotor has a top surface, a bottom surface, an outer circumferential surface and an inner circumferential surface, each aperture extending from the top surface to the bottom surface.

20. The torque sensing system of claim 17, wherein the second rotor includes first and second ring-shaped plates disposed apart from one another such that the open region is located between the first and second ring-shaped plates, each of the first and second ring-shaped plates having a portion of the plurality of tooth members thereon.

21. The torque sensing system of claim 16, wherein the first and second Hall effect sensors are disposed a predetermined number of degrees apart from one another relative to a central axis of the first rotor.

22. A steering system for a vehicle, comprising:
an upper steering shaft;
a lower steering shaft;
a torque sensor operably coupled to both the upper steering shaft and the lower steering shaft, the torque sensor having a first rotor, a plurality of bar magnets, a second rotor, and first and second Hall effect sensors, the first rotor comprising a plurality of plates coupled together, the plurality of plates forming a first rotor body that has an inner circumferential surface and an outer circumferential surface and that defines a plurality of apertures that extend through the first rotor body inward from the outer circumferential surface, the plurality of bar magnets disposed in the plurality of apertures, each aperture of the plurality of apertures having a respective bar magnet of the plurality of bar magnets therein, the second rotor defining an interior region, the first rotor being rotatably disposed in the interior region, the second rotor having a plurality of tooth members extending toward the first rotor, the first and second Hall effect sensors disposed in an open region of the second rotor proximate to the first rotor, the first and second Hall effect sensors generating first and second signals, respectively, indicative of an amount of torque applied between the first and second rotors.

* * * * *